(12) United States Patent
Ungefug et al.

(10) Patent No.: US 6,779,882 B2
(45) Date of Patent: Aug. 24, 2004

(54) INK-JET PRINTING SYSTEMS AND METHODS FOR EXTENDING AIR FADE RESISTANCE OF INK-JET PRINTS

(75) Inventors: Gary Allan Ungefug, Corvallis, OR (US); Vladek P Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/267,288

(22) Filed: Oct. 8, 2002

(65) Prior Publication Data

US 2004/0066440 A1 Apr. 8, 2004

(51) Int. Cl.⁷ ................................................. B41J 2/01
(52) U.S. Cl. ........................ 347/101; 347/100; 347/105
(58) Field of Search ................................. 347/101, 100, 347/105, 96, 95; 428/195, 32.1; 106/31.13; 523/160

(56) References Cited

U.S. PATENT DOCUMENTS

| | | | |
|---|---|---|---|
| 6,057,384 A | 2/2000 | Nguyen et al. | |
| 6,127,452 A | 10/2000 | Kato | |
| 6,455,679 B1 * | 9/2002 | Tateishi et al. | 106/31.48 |
| 6,508,548 B2 * | 1/2003 | Erdtmann et al. | 347/100 |
| 6,547,865 B2 * | 4/2003 | Andrievsky et al. | 347/100 |
| 6,646,024 B2 * | 11/2003 | Beach et al. | 523/160 |
| 2002/0094418 A1 | 7/2002 | Landry-Coltrain et al. | |

FOREIGN PATENT DOCUMENTS

| | | |
|---|---|---|
| EP | 1035179 A1 | 9/2000 |
| EP | 1106376 A1 | 6/2001 |
| EP | 1201720 A1 | 2/2002 |
| EP | 1226963 A2 | 7/2002 |

* cited by examiner

Primary Examiner—Stephen D. Meier
Assistant Examiner—Manish Shah

(57) ABSTRACT

The present invention is drawn to systems and methods for reducing air fade of ink-jet inks, particularly with respect to dye-based ink-jet inks printed on porous media. Specifically, a method of printing an image on porous media with increased air fade resistance can include the steps of (a) providing an ink-jet ink, wherein the ink-jet ink includes a dye and a water-soluble or water dispersable copolymer in a vehicle carrier; (b) providing a porous media substrate having an inorganic porous media coating, wherein the inorganic porous media coating provides voids for the ink-jet ink to fill; and (c) ink-jetting the ink-jet ink onto the porous media substrate, thereby providing an image having increased air fade resistance.

28 Claims, No Drawings

INK-JET PRINTING SYSTEMS AND METHODS FOR EXTENDING AIR FADE RESISTANCE OF INK-JET PRINTS

FIELD OF THE INVENTION

The present invention is drawn to systems and methods for reducing air fade of printed ink-jet inks, particularly with respect to dye based ink-jet inks printed on porous media.

BACKGROUND OF THE INVENTION

Computer printing technology has evolved to a point where very high resolution images can be prepared on various types of media. This has been, in part, why ink-jet printing has become a popular way of recording images on various media, particularly paper. Other reasons include low noise, capability of high speed recording, and multi-color recording. Additionally, these advantages can be obtained at a relatively low price to consumers. Though there has been great improvement in ink-jet printing, accompanying this improvement are increased demands on ink-jet printing, e.g., higher speed, higher resolution, full color image formation, image permanence, etc.

There are several characteristics to consider when evaluating a printer ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long-term storage stability, and long-term reliability without corrosion or nozzle clogging. In addition to these characteristics, when printing on inorganic porous media substrates, light fade and air fade resistance is also an issue for consideration. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Papers used for ink-jet printing have typically included high-quality or wood-free papers designed to have a high ink absorptivity. These papers are functionally good for ink-jet printing because the ink-jet inks may be absorbed readily and dry quickly. However, such papers often do not allow for a crisp or sharp image.

In order to attain enhanced print quality and image quality as in a photograph, special media has been developed to work with aqueous inks. For example, various coated papers (art paper, coat paper, cast-coat paper, etc.) have been prepared by coating a layer comprising a hydrophilic binder and an inorganic pigment on a paper substrate. Additionally, recording sheets have been prepared by coating an ink absorptive layer on paper or other supports, e.g., transparent or opaque plastic film supports. An example of such specialty media utilizes a swelling-type ink absorptive layer, e.g., gelatin. Though swellable media provides a relatively good substrate with respect to certain image quality properties, a drawback includes the fact that swellable media requires more dry-time than other types of media. Therefore, experimentation in the area of ink-jet printing on inorganic porous media substrates has become more and more common, though such media presents its own set of challenges.

SUMMARY OF THE INVENTION

It has been recognized that it would be advantageous to develop methods and systems for reducing air fade with respect to dye-based ink-jet inks printed on inorganic porous media substrates. It has further been recognized that such methods and systems would be particularly advantageous if air fade could be reduced without the need for an additional coating step.

In accordance with these recognized advantages, the invention provides a method of printing an image on porous media with increased air fade resistance.

The ink-jet ink comprises a dye and an effective amount of water-soluble or water dispersible copolymer. The porous media substrate has an inorganic porous media coating that defines voids for accepting the ink-jet ink, thereby providing an image having increased air fade resistance due to the presence of a film formed by the copolymer of the ink-jet ink.

In accordance with a more detailed aspect of the present invention, the method includes the step of ink-jetting the ink-jet ink onto the porous media substrate, said ink-jet ink comprising a dye and an effective amount of water-soluble or water dispersible copolymer, said porous media substrate having an inorganic porous media coating that defines voids for accepting the ink-jet ink, thereby providing an image having increased air fade resistance due to the presence of a film formed by the copolymer of the ink-jet ink.

The ink-jet ink preferably comprises a dye and a water-soluble or water dispersable copolymer in a vehicle carrier. The porous media substrate provided can include an inorganic porous media coating, such as a silica- or alumina-based coating. Such a coating can provide voids to be filled by the ink-jet ink. Once the appropriate ink-jet ink and the porous media substrate are provided, the step of ink-jetting the ink-jet ink onto the porous media substrate can be carried out, providing an image having increased air fade resistance. In an alternative embodiment, a system for printing an image on porous media with increased air fade resistance can comprise an ink-jet ink, a porous media substrate, and an ink-jet pen containing the ink-jet ink and configured for printing on the porous media substrate. The ink-jet ink can comprise a dye and a water-soluble or water dispersable copolymer in a vehicle carrier. The porous media substrate can have an inorganic porous media coating. Such coatings can provide fillable voids for the ink-jet ink to enter. An ink-jet pen can also be present that is configured for ink-jetting the ink-jet ink onto the porous media substrate. With this arrangement, upon ink-jetting the ink-jet ink onto the porous media substrate, the ink-jet ink can fill the voids and the copolymer portion of the ink-jet ink can substantially seal dye molecules of the ink-jet ink within the voids.

Additional features and advantages of the invention will be apparent from the detailed description which follows, taken in conjunction with the accompanying embodiments and examples.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

As used herein, "effective amount" refers to the minimal amount of a substance or agent, which is sufficient to achieve a desired effect. For example, an effective amount of a "liquid medium" or "vehicle carrier" is at least a minimum amount required in order to solubilize or disperse copolymers in accordance with the present invention while providing good ink-jettability properties, thereby meeting functional performance and characteristic standards.

"Porous media" refers to any substantially inorganic composition-coated media having surface voids and/or cavities capable of taking in the ink-jet inks of the present invention. As ink is printed on the porous media, the ink can fill the voids and the outermost surface can become dry to the touch in a more expedited manner as compared to traditional or swellable media. Common coatings included silica- and alumina-based coatings.

"Chroma" refers to the brightness exhibited by the ink-jet ink once printed on the substrate.

"Light fade" refers to a phenomenon of fading of the brightness or chroma, or hue shifting of a printed image over time due primarily to exposure to visible and invisible light frequencies.

"Air fade" refers to a phenomenon of fading of the brightness or chroma, or hue shifting of a printed image over time due to exposure to air contaminants, including ozone and air pollutants, e.g., auto emissions.

"Acrylic acid or methacrylic acid-based" to describe a copolymer that can be present in an ink-jet ink composition refers to liquid suspensions or solutions comprising a vehicle carrier or liquid medium (such as water), an acrylic and/or methacrylic acid monomer(s), and at least one additional acrylate and/or methacrylate monomer(s), wherein the monomers are randomly polymerized and can further be crosslinked. The copolymer can be in a solubilized or suspended form. In one embodiment, a suspended latex copolymer can be used, wherein the particulates in the latex suspension can be from 10 nm to 400 nm in size. In either embodiment, the weight average molecular weight of the copolymer can be from about 5,000 Mw to 50,0000 Mw. Typically, the polymeric particulates will be present in the vehicle carrier or liquid medium at from 2% to 8% by weight.

The term "lower" when referring to a straight or branched alkyl chain includes alkyl chains having from 1 to 8 carbon atoms, i.e., methyl, ethyl, propyl, iso-propyl, butyl, t-butyl, n-hexyl, 2-ethylhexyl, iso-octyl, etc.

With these definitions in mind, a method of printing an image on porous media wherein the resulting image exhibits increased air fade resistance is provided. The method can comprise the steps of providing a desired ink-jet ink, a desired porous media substrate, and ink-jetting the desired ink-jet ink onto the desired porous media substrate. In further detailed, the ink-jet ink can comprise a dye and a water-soluble or water dispersible copolymer in a vehicle carrier or liquid medium. In one embodiment, the copolymer can be an acrylic- or methacrylic-based copolymer. By acrylic- or methacrylic-based copolymer, what is meant is that the copolymer comprises acrylic- or methacrylic-containing monomers, as well as at least one other acrylic or methacrylic monomer. For example, the copolymer can comprise acrylic acid or methacrylic acid present at from 10% to 40% of the total solids by weight. In addition, the copolymer can also comprise at least one additional acrylic- or methacrylic-based monomer present alone or in combination with other acrylic- or methacrylic-based monomers at from 60% to 90% of the total solids by weight. If the copolymer is in the form of a latex copolymer, the latex polymeric component can either be dissolved or suspended in the vehicle, depending on other chemical components that may be present. For example, potassium hydroxide can be added to dissolve certain copolymers.

In conjunction with the use of the above dye- and acrylic- or methacrylic-based ink-jet ink, a porous media substrate can be provided having an inorganic porous media coating. Various coatings are appropriate for use including silica-containing coatings and alumina- or boehmite-containing coatings. These coatings provide voids in the surface for accepting ink-jet inks once jetted onto the surface.

Once the proper porous media substrate and ink-jet ink combination is provided, the step of ink-jetting the ink-jet ink onto the porous media substrate can be carried out by thermal or piezo ink-jetting methods. This combination of steps can provide an image having increased air fade resistance due to the substantial sealing of dye molecules within the pores of the porous media substrate by the copolymer. In other words, the copolymer can act as a film-forming polymer to the ink-jet ink (which also contains the dye colorant), thereby protecting the dye from air and air contaminants. This method can be advantageous because it does not require an additional coating or lamination step to protect the printed image.

In a related embodiment, a system for printing an image on porous media with increased air fade resistance can comprise an ink-jet ink, a porous media substrate, and an ink-jet pen configured for containing the ink-jet ink and for printing the ink-jet ink onto the porous media substrate. Specifically, the ink-jet ink can be a dye-based ink-jet ink also comprising a water soluble or water dispersible copolymer, such as an acrylic- or methacrylic-based copolymer. The copolymer can comprise acrylic or methacrylic monomers. For example, acrylic acid or methacrylic acid can be present in the ink-jet ink at from 10% to 40% of the total solids by weight. Additionally, the copolymer can also comprise at least one additional acrylic- or methacrylic-based monomer present alone or in combination with other acrylic- or methacrylic-based monomers at from 60% to 90% of the total solids by weight. The porous media substrate can include an inorganic porous media coating, such as an alumina- or silica-based coating. Such coatings do not swell like gelatin or other swellable media, but provide voids for ink-jet inks to fill. The ink-jet pen of the system can be configured for ink-jetting the ink-jet ink onto the porous media substrate such that, upon ink-jetting, the ink-jet ink will the voids and the acrylic- or methacrylic-based copolymer portion of the ink-jet ink will seal a dominant percentage of the dye molecules of the ink-jet ink within the voids.

With respect to the methods or systems described herein, and in further detail, the at least one additional acrylic- or methacrylic-based monomers can be independently selected from the group consisting of lower alkyl acrylates, lower alkyl methacrylates, hydroxyethyl acrylate, hydroxyethyl methacrylate, phenethyl acrylate, phenethyl methacrylate, cyclohexyl acrylate, and methoxy poly(ethylene glycol) acrylate, methoxy poly(ethylene glycol) methacrylate. Combinations of the above monomers can be present if a combination of monomers are present Preferred monomers for use include individually, methyl methacrylate, n-hexyl acrylate, and methoxy poly(ethylene glycol) methacrylate. With respect to the methoxy poly(ethylene glycol) methacrylate, monomers having a weight average molecular weight from 200 Mw to 3000 Mw are preferred.

In a more detailed aspect, a copolymer can be prepared that includes from 20% to 40% of the total solids by weight of methyl methacrylate, from 30% to 60% of the total solids by weight of n-hexyl acrylate, and from 10% to 30% of the total solids by weight of methoxy poly(ethylene glycol) methacrylate. These three monomers, in conjunction with the acrylic acid or methacrylic acid present at from 10% to 40% of the total solids by weight provide an effective copolymer for use in accordance with the systems and methods of the present invention.

With respect to the systems and methods described herein, variations can also be present. For example, in one embodiment, the copolymer can be crosslinked. In another embodiment, the copolymer can be a solubilized form, such as would occur in the presence of a solubilizing agent, e.g., potassium hydroxide. In still another embodiment, the copolymer can be a dispersed or non-solubilized form having particulate sizes from 10 nm to 400 nm. Additionally, the copolymer can be present in the form of a latex. Whatever embodiment selected for use, it is preferred that the weight average molecular weight of the acrylic- or methacrylic-based copolymer solids be from 5,000 Mw to 50,0000 Mw, though molecular weights outside of this range can also be used with some degree of success.

With respect to the dye of the ink-jet ink, the dye can be present in the ink-jet ink formulation at from about 0.1% to 10% by weight. Any dye used can be of a particular color or black, depending on the application or desired use. Examples of dyes that can be used include, but are not limited to Direct Red 9, Direct Red 254, Acid Red 249, Magenta 377, Reactive Red 180, Acid Red 52, Reactive Red 56, Acid Red 92, Reactive Red 31 Acid Yellow 23, Direct Yellow 86, Yellow 104, Direct Yellow 4, Yellow PJY H-3RNA, Direct Yellow 50, Direct Yellow 132, Direct Yellow 157, Reactive Yellow 37, carboxylated Food Black 286, carboxylated Food Black 287, Direct Black 168, Reactive Black 31, Acid Orange 7, Direct Blue 199, Acid Blue 9, Direct Blue 86; Aminyl Brilliant Red F-B (Sumitomo Chemical Co.); the Duasyn line of "salt-free" dyes available from Hoechst; mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Cibracron Brilliant Red 38-A (Reactive Red 4, Aldrich Chemical), Levafix Brilliant Red E-4B (Mobay Chemical), Levafix Brilliant Red E-6BA (Mobay Chemical), Direct Brill Pink B (Crompton & Knowles), Cartasol Yellow GTF (Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. This list is provided as exemplary, and is not intended to be limiting.

Though various exemplary dyes, ink-vehicle components, copolymer components, and the like have been provided, they are provided by example only. Other components not described can be used as would be known by those skilled in the art after reading the present disclosure.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

EXAMPLE 1

Preparation of an Acrylic-based Latex Copolymer (15% Solids)

To 1080.1 g of water was added 2.4 g of potassium persulfate (1.03% based on monomer content or "on monomers"), and the mixture was charged in a reaction flask to form a reactor phase. A monomer feed was then prepared in two phases, a water phase and an organic phase. The water phase was prepared by addition of 6.54 g of Rhodafac RS 710 (2.8% on monomers) to 205.6 g of water. The organic phase was prepared by mixing 74.7 g of methyl methacrylate, 107.37 g of n-hexyl acrylate, 28.01 g MPEG (350)MA, 23.34 g of acrylic acid, 2.33 g of isooctylthioglycolic acid chain transfer agent (1.0% on monomers), and 3.62 g of Brij 92 (1.55% on monomers). The organic phase was added to the water phase over 3 minutes while mixing vigorously with a propeller stirrer, and mixed for an additional 2 minutes. The reactor phase was heated to 85° C. while degassing with nitrogen. When 85° C. was reached, the monomer feed was started and continued over 150 minutes. The monomer emulsion was stable over the addition. When the addition was complete, the mixture was allowed to stir at 85° C. for 10 hours. Polymerization ran cleanly and filtered easily (500 g/filter) through a glass microfiber filter. Neutralization to pH 8.5 was then carried out using a 50% solution of potassium hydroxide.

EXAMPLE 2

Preparation of an Acrylic-based Copolymer (~25% Solids)

An acrylic-based copolymer having the same polymeric components to that prepared in Example 1 was prepared, except that it was prepared having 24.77% solids and it was not a latex. The neutralized acrylic-based copolymer was added to two samples of a dye-based magenta ink having HP part number GLD-100967 at two different concentrations (Ink 1 and Ink 2). Additionally, a reference ink (Ink 3) was prepared by adding water to the magenta ink to produce an ink with a dilution similar to that with the added copolymer of Ink 1. Specifically, Inks 1–3 were prepared according to the specifications of Table 1 below:

TABLE 1

| Additive | Magenta Ink | Additive | % Solids in Ink | Total Composition | % Coolymer in Ink |
|---|---|---|---|---|---|
| Ink 1 | 50.0 g | 8.07 g | 4.0% | 58.1 g | 3.4% |
| Ink 2 | 50.0 g | 4.04 g | 2.0% | 54.0 g | 1.9% |
| Ink 3 | 50.0 g | 8.0 g | 0.0% | 58.0 g | 0.0% |

EXAMPLE 3

The three magenta inks of Table 1 were printed onto a porous coated media sheet using a DeskJet 970 Cxi printer using a 3-chamber pen having HP part number C6578A. Specifically, an image was printed having a fade pallet consisting of a broad spectrum of print densities. Fade of the print samples was followed as the prints were placed in an air fade chamber which simulates air conditions over a long period of time in the absence of light, i.e., chamber exposes prints to ambient moving air in the dark. All compositions exhibited acceptable jettability properties.

During the air fade simulation process, the optical density (OD) loss was plotted with time starting when the OD was 1.0, as provided below:

TABLE 2

| | Ink 1 (OD) | Ink 2 (OD) | Ink 3 (OD) |
|---|---|---|---|
| 0 hrs | 1.00 | 1.00 | 1.00 |
| 100 hrs | 1.00 | 0.97 | 0.97 |
| 200 hrs | 1.00 | 0.97 | 0.97 |
| 300 hrs | 1.01 | 0.98 | 0.97 |
| 400 hrs | 0.96 | 0.92 | 0.88 |
| 500 hrs | 0.95 | 0.87 | 0.83 |
| 600 hrs | 0.89 | 0.82 | 0.75 |
| 700 hrs | 0.85 | 0.75 | 0.69 |
| 800 hrs | 0.80 | 0.72 | 0.65 |
| 900 hrs | 0.78 | 0.68 | 0.61 |

Table 2 above illustrates that the air fade rate of the water-diluted ink (Ink 3) was the most rapid. The 2% copolymer-containing ink-jet ink (Ink 2) faded more slowly than the water-diluted ink-jet ink, and the 4% copolymer-containing ink-jet ink (Ink 1) faded the slowest of the set. Assuming that an OD of below 0.75 is unacceptable, after 900 hours, Ink 1 was still deemed to be acceptable, Ink 2 failed after 700 hours, and Ink 3 failed after 600 hours.

EXAMPLE 4

The three magenta inks of Table 1 were printed on a porous coated media sheet to determine whether chroma ($C^*$) and the saturation ($C^*/L^*$) of the printed pallets were diminished due to the presence of the acrylic acid-based copolymer. Specifically, three separate pallets of various densities were printed using each ink, and the results related to chroma ($C^*$) and saturation ($C^*/L^*$) are provided below in Tables 3 and 4, respectively.

TABLE 3

| | Ink 1 ($C^*$) | Ink 2 ($C^*$) | Ink 3 ($C^*$) |
|---|---|---|---|
| 20 pL/300 | 63 | 66 | 67 |
| 40 pL/300 | 74 | 76 | 77 |
| 60 pL/300 | 77 | 77 | 78 |
| 80 pL/300 | 77 | 75 | 76 |
| 100 pL/300 | 75 | 73 | 74 |
| 120 pL/300 | 74 | 72 | 73 |

TABLE 4

| | Ink 1 ($C^*/L^*$) | Ink 2 ($C^*/L^*$) | Ink 3 ($C^*/L^*$) |
|---|---|---|---|
| 20 pL/300 | 1.02 | 1.10 | 1.10 |
| 40 pL/300 | 1.45 | 1.52 | 1.50 |
| 60 pL/300 | 1.70 | 1.78 | 1.74 |
| 80 pL/300 | 1.88 | 1.88 | 1.83 |
| 100 pL/300 | 1.90 | 1.89 | 1.86 |
| 120 pL/300 | 1.92 | 1.91 | 1.87 |

As apparent from Tables 3 and 4, the chroma ($C^*$) and saturation ($C^*/L^*$) was very similar for all three inks tested. Therefore, it appears that the presence of an acrylic- or methacrylic-based copolymer does not significantly alter the color properties compared to an ink diluted with a similar amount of water by weight.

It is to be understood that the above arrangements and Examples are only illustrative of the application for the principles of the present invention. Numerous modifications and alternative arrangements can be devised without departing from the spirit and scope of the present invention. While the present invention has been described by examples and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. A method of printing an image on porous media with increased air fade resistance, comprising:

ink-jetting an ink-jet ink onto a porous media substrate, said ink-jet ink comprising a dye and an effective amount of water-soluble or water dispersible copolymer, said porous media substrate having an inorganic porous media coating that defines voids for accepting the ink-jet ink, thereby providing an image having increased air fade resistance due to the presence of a film formed by the copolymer of the ink-jet ink.

2. A method as in claim 1, wherein the water-soluble or water dispersable copolymer is an acrylic- or methacrylic-based copolymer, said copolymer comprising acrylic acid or methacrylic acid present at from 10% to 40% of the total copolymer solids by weight, said copolymer further comprising at least one additional acrylic- or methacrylic-based monomers present at from 60% to 90% of the total copolymer solids by weight.

3. A method as in claim 2, further comprising the step of substantially sealing dye molecules of the ink-jet ink in the voids of the porous media substrate by the copolymer.

4. A method as in claim 2, wherein the at least one additional acrylic- or methacrylic-based monomer is selected from the group consisting of lower alkyl acrylates, lower alkyl methacrylates, hydroxyethyl acrylate, hydroxyethyl methacrylate, phenethyl acrylate, phenethyl methacrylate, cyclohexyl acrylate, and methoxy poly(ethylene glycol) acrylate, and methoxy poly(ethylene glycol) methacrylate.

5. A method as in claim 2, wherein the water-soluble or water dispersable copolymer comprises the acrylic- or methacrylic-based copolymer, said copolymer further comprising at least two additional acrylic- or methacrylic-based monomer present in combination at from 60% to 90% of the total copolymer solids by weight.

6. A method as in claim 5, wherein one of the at least two additional acrylic- or methacrylic-based monomers is methyl methacrylate.

7. A method as in claim 5, wherein one of the at least two additional acrylic- or methacrylic-based monomers is n-hexyl acrylate.

8. A method as in claim 5, wherein one of the at least two additional acrylic- or methacrylic-based monomers is methoxy poly(ethylene glycol) methacrylate having a weight average molecular weight from 200 to 3000 Mw.

9. A method as in claim 2, wherein the acrylic- or methacrylic-based copolymer includes, measured by weight of the total copolymer solids, from 20% to 40% methyl methacrylate, from 30% to 60% n-hexyl acrylate, and from 10% to 30% methoxy poly(ethylene glycol) methacrylate.

10. A method as in claim 2, wherein the acrylic- or methacrylic-based copolymer is a crosslinked copolymer.

11. A method as in claim 2, wherein the acrylic- or methacrylic-based copolymer is in a solubilized form due to the presence of a solubilizing agent within the ink-jet ink.

12. A method as in claim 2, wherein the acrylic- or methacrylic-based copolymer is in a non-solubilized form and has a particulate size from 10 nm to 400 nm in size.

13. A method as in claim 2, wherein the weight average molecular weight of the acrylic- or methacrylic-based copolymer solids is from 5,000 Mw to 50,0000 Mw.

14. A method as in claim 2, wherein the acrylic- or methacrylic-based copolymer is randomly polymerized.

15. A method as in claim 2, wherein the acrylic- or methacrylic-based copolymer is a latex.

16. A system for printing an image on porous media with increased air fade resistance, comprising:

(a) an ink-jet ink, said ink-jet ink comprising a dye and an effective amount of water-soluble or water dispersable copolymer;

(b) a porous media substrate having an inorganic porous media coating, said inorganic porous media coating providing voids for the ink-jet ink to fill; and (c) an ink-jet pen configured for ink-jetting the ink-jet ink onto the porous media substrate such that, upon ink-jetting, the ink-jet ink fills the voids and the acrylic-based copolymer portion of the ink-jet ink substantially seals dye molecules of the ink-jet ink within the voids.

17. A system as in claim 16, wherein the water-soluble or water dispersable copolymer comprises an acrylic- or methacrylic-based copolymer, said copolymer comprising acrylic acid or methacrylic acid present at from 10% to 40% of the total copolymer solids by weight, said copolymer further comprising at least one additional acrylic- or methacrylic-based monomer present at from 60% to 90% of the total copolymer solids by weight.

18. A system as in claim 17, wherein the at least one additional acrylic- or methacrylic-based monomer is selected from the group consisting of lower alkyl acrylates, lower alkyl methacrylates, hydroxyethyl acrylate, hydroxyethyl methacrylate, phenethyl acrylate, phenethyl methacrylate, cyclohexyl acrylate, and methoxy poly(ethylene glycol) acrylate, and methoxy poly(ethylene glycol) methacrylate.

19. A system as in claim 17, wherein the water-soluble or water dispersable copolymer comprises the acrylic- or methacrylic-based copolymer, said copolymer further comprising at least two additional acrylic- or methacrylic-based monomer present in combination at from 60% to 90% of the total copolymer solids by weight.

20. A system as in claim 19, wherein one of the at least two additional acrylic- or methacrylic-based monomers is methyl methacrylate.

21. A system as in claim 19, wherein one of the at least two additional acrylic- or methacrylic-based monomers is n-hexyl acrylate.

22. A system as in claim 19, wherein one of the at least two additional acrylic- or methacrylic-based monomers is methoxy poly(ethylene glycol) methacrylate having a weight average molecular weight from 200 Mw to 3000 Mw.

23. A system as in claim 17, wherein the acrylic- or methacrylic-based copolymer includes, measured by weight of the total copolymer solids, from 20% to 40% methyl methacrylate, from 30% to 60% n-hexyl acrylate, and from 10% to 30% methoxy poly(ethylene glycol) methacrylate.

24. A system as in claim 17, wherein the acrylic- or methacrylic-based copolymer is a crosslinked copolymer.

25. A system as in claim 17, wherein the acrylic- or methacrylic-based copolymer is in a solubilized form due to the presence of a solubilizing agent within the ink-jet ink.

26. A system as in claim 17, wherein the acrylic- or methacrylic-based copolymer is in a non-solubilized form and has a particulate size from 10 nm to 400 nm in size.

27. A system as in claim 17, wherein the weight average molecular weight of the acrylic- or methacrylic-based copolymer solids is from 5,000 Mw to 50,0000 Mw.

28. A system as in claim 17, wherein the acrylic- or methacrylic-based copolymer is a latex.

* * * * *